Figure 1:
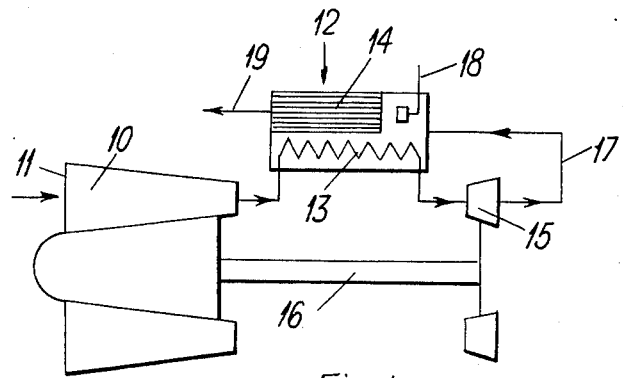

United States Patent [19]

Dawson

[11] 4,062,190

[45] Dec. 13, 1977

[54] GAS TURBINE ENGINE

[75] Inventor: Lindsay Grahame Dawson, Loughborough, England

[73] Assignee: Rolls-Royce Limited, London, England

[21] Appl. No.: 557,838

[22] Filed: Mar. 12, 1975

[30] Foreign Application Priority Data

Mar. 26, 1974 United Kingdom ............... 13230/74

[51] Int. Cl.² ........................... F02C 1/04; F02C 7/00
[52] U.S. Cl. ..................................... 60/682; 431/326; 431/329
[58] Field of Search ................ 431/326, 329; 122/367, 122/11; 60/682, 650, 683, 670, 669

[56] References Cited

U.S. PATENT DOCUMENTS

| | | | |
|---|---|---|---|
| 1,921,901 | 8/1933 | Anderson | 431/329 X |
| 2,298,625 | 10/1942 | Larrecq | 60/683 X |
| 3,315,646 | 4/1967 | Witten, Jr. | 122/367 |
| 3,563,031 | 2/1971 | Topouzian | 60/39.51 H |
| 3,699,681 | 10/1972 | Frutschi | 60/682 |
| 3,797,231 | 3/1974 | McLean | 60/39.51 H |
| 3,850,147 | 11/1974 | Doerner | 60/669 |

Primary Examiner—Allen M. Ostrager
Attorney, Agent, or Firm—Cushman, Darby and Cushman

[57] ABSTRACT

A heat input device for a heat engine comprises a combustion device which is adapted to support surface burning of a fuel and oxidant mixture and a heat exchanger which is adapted to transfer the heat from the hot surface against which the surface burning takes place to the working fluid of the engine.

11 Claims, 3 Drawing Figures

GAS TURBINE ENGINE

This invention relates to a heat input device for a heat engine.

In heat engines, of which the gas turbine engine and the Stirling cycle engine are particular examples, the input of heat to the working fluid often presents a difficulty. This is particularly the case in Stirling cycle engines, where the high pressure of the working fluid at the heat input stage makes it difficult to input heat, and this tends to limit performance with conventional combustion chambers or other forms of heat input devices.

It has also been an aim of designers in the gas turbine engine to increase the highest temperature of the cycle, to improve the cycle efficiency. This has again been difficult with conventional heat input devices.

The present invention provides a heat input device for a heat engine which can provide a high temperature of the heat input.

According to the present invention a heat input device for a heat engine comprises means within which surface burning of a fuel/oxidant mixture can take place and heat exchange means by which the heat from the hot surface heated by the surface burning can be transferred to the working fluid of the engine.

Said heat engine may comprise a gas turbine engine, or may comprise a Stirling cycle engine.

Thus, said gas turbine engine may comprise a compressor, a combustion system and a turbine, the compressor and turbine being drivingly interconnected the combustion system being adapted to heat compressed gas from the compressor before it passes through the turbine to drive the turbine and the combustion system comprising means within which surface burning of a fuel/oxidant mixture may take place.

Preferably said gas is air, and then air flow through the engine provides the oxidant for said surface burning.

In this case the compressed air from the compressor is preferably heated by heat exchange in the combustion system before passing through the turbine, the exhaust air for the turbine providing the oxidant for the surface burning.

The surface burning may take place within any matrix having an extended surface, for example a porous means, or a bundle of fine tubes of silica, alumina, high temperature resistant metal or other heat resistant material. There may be a further heat exchanger adapted to exchange heat between the exhaust of the surface burning device and the compressor delivery air.

Said heat exchangers may comprise rotary heat exchangers.

Figure 2:
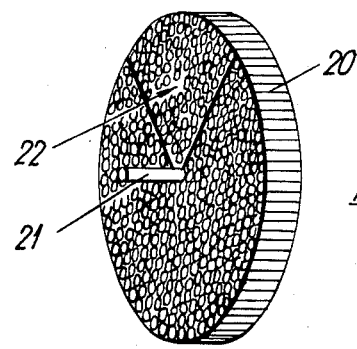
Figure 3:
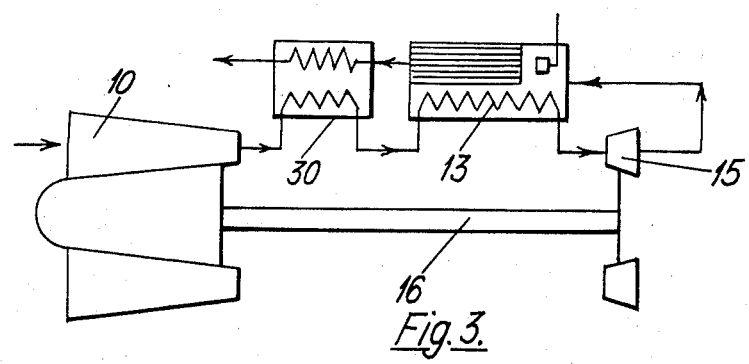

The invention will now be particularly described, merely by way of example, with reference to the accompanying drawings in which:

FIG. 1 is a diagram of the layout of a gas turbine having a heat input device in accordance with the present invention, FIG. 2 is a diagrammatic view of a heat exchanger for the engine of FIG. 1, and FIG. 3 is a diagrammatic layout of a further embodiment.

In FIG. 1 there is shown a gas turbine engine comprising an axial flow compressor 10 which takes in air through an intake 11, compresses it and delivers the compressed air to a combustion system 12. The combustion system 12 comprises a heat exchange passes 13 through which the compressor delivery air passes, the air in the passage 13 being arranged to be in thermal contact with a surface burning arrangement 14 described below.

The air is thus heated in the passage 13 and passes to an axial flow turbine 15 through which it expands to drive the turbine in the normal manner. A shaft 16 drivingly interconnects the turbine and compressor so that the compressor 10 is driven from the turbine.

Exhaust air from the turbine 15 is passed through ducting 17 past a fuel injector 18 to the surface burning arrangement 14. The fuel injector 18 causes fuel, such as kerosene or a gaseous hydrocarbon fuel, to be mixed intimately with the air, so that it forms a combustible mixture on reaching the surface burning arrangement 14. This arrangement may comprise one of a number of alternative arrangements, the main criterion being that a large area of surface suitable for supporting the phenomenon of surface burning is provided. We prefer to provide a bundle of fine silica or alumina tubes, enabling the fuel/air mixture to pass inside the tubes and the passage 13 to be provided outside the tubes, or vice versa. Alternatively the tube bundle or a typical matrix could form part of a rotary heat exchanger, as described below, or a similar rotary heat exchanger of conventional matrix form could be used, subject to its being provided with sufficient surface area.

In the preferred case, the fuel/air mixture burns in the tubes, and because of the relatively large surface area available, the combustion takes the form of surface burning. In surface burning, although the fuel/air mixture may not be stoichiometric, the temperature of the surface is raised to a temperature considerably above what would be the case in normal combustion.

Surface combustion or surface burning is a well known phenomena which may be produced in a variety of ways. It has been used in industrial applications since at least 1900.

Thus the advantage of surface burning is that the chemical reaction takes place on the surface and the temperature of the wall adjacent to the reaction is considerably higher than the discharge temperature of the gas corresponding to the air fuel ratio of the reaction. To quote an example, in a laboratory experiment, burning a kerosene/air mixture in which the temperture rise corresponding to the air fuel ratio was 400° C gave an exit gas temperature of 700° C. The temperature of the wall in a surface burning apparatus was approximately 1600° C.

If one were using a heat transfer device to transfer heat from the combustion air to the working fluid then with normal arrangements the temperature difference available to transfer the heat would be based on a gas temperature of 700° C. The wall separating the hot gas from the colder working fluid would be at a temperature less than 700° C. By using a surface burning arrangement the wall temperature is markedly increased in the example given having a maximum possible value of 1600° C and the temperature difference available for heat transfer is thus much greater.

The tubes therefore become very hot, and the heat is transferred to the air in the passage 13.

Exhaust gases from the arrangement 14 leave via a duct 19 and are taken to a location of use, which may comprise a further turbine or an exhaust nozzle.

In FIG. 2 there is shown how a rotary heat exchanger may be used to provide both the surface burning arrangement and the heat exchange with the compressor delivery air. In this case a rotary heat exchanger is made up of a cylindrical bundle of the fine silica tubes 20 or a typical matrix ceramic or metal referred to above, the tubes being arranged to be coaxial with the cylinder. The cylinder is mounted for rotation about its axis on a shaft 21, and sealed inlet and outlet ducting allow the fuel/air mixture to flow through the tubes in the sector 22 while the compressor delivery air flows in contraflow through the remainder of the tubes, or through some of them. The cylinder is slowly rotated by means not shown and surface combustion is arranged to take place in the tubes within the sector 22. These tubes are therefore heated, and when they leave the sector 22 due to the rotation of the cylinder, they transfer heat to the flow of compressor delivery air. The cylinder thus provides the surface burning arrangement and heat exchanger in one unit.

It will be appreciated that it may be possible to use the conventional form of metal or ceramic matrix for the rotary heat exchanger; this may comprise windings of corrugated and flat metal or ceramic containing strips which produce a matrix having a plurality of axially extending passages. The size of the passages may require to be differently sized from those of the conventional type of exchanger in order to produce the optimum results from surface burning.

In FIG. 3 there is shown a further embodiment. This embodiment is broadly similar to that of FIG. 1, but it will be seen that a further heat exchanger 30 is provided in which the exhaust gases from the surface burning arrangement and the compressor delivery air prior to its entry into the passage 13 are maintained in heat exchanger relationship. In this way the heat left in the exhaust gases is used in the engine. The exchanger 30 may comprise a rotary heat exchanger as in FIG. 2 or it may comprise a more simple device.

It will be appreciated that the engine arrangements described above are relatively simple, and that more complex devices such as multi-shaft engines may be used. Again, it has been found difficult in the past to initiate surface combustion in kerosene/air mixtures without first using a light gas such as acetylene to preheat the surface combustion arrangement, and it may prove necessary to use a different fuel to start the engine, and/or to provide additional preheating means for the surface combustion arrangement.

Although the tube bundle described above as the surface burning arrangement is particularly convenient, other forms of arrangement such as a mass of particles or surface textured plates etc. could be used, as could a variety of different materials.

I claim:

1. A system of the type comprising, in combustion, a heat engine and a heat input device, said heat engine having a gas working fluid wherein: said heat input device comprises a unitary heat exchange body having an extended surface against which surface burning of a fuel and oxidant mixture can take place, and a heat exchange surface forming part of the heat exchange body and in thermal contact with the extended surface, said heat exchange surface being directly heated by conduction of heat from the extended surface and adapted to transfer this heat to the working fluid of the engine.

2. The system of claim 1 wherein said heat engine comprises a Stirling cycle engine.

3. The system of claim 1 wherein said heat engine comprises a gas turbine engine.

4. The system of claim 3 wherein said gas turbine engine comprises a compressor, a combustion system and a turbine, the compressor and turbine being drivingly interconnected and the combustion system being adapted to heat compressed gas from the compressor before it passes through the turbine to drive the turbine, the combustion system also comprising means within which said surface burning of a fuel oxidant mixture may take place.

5. The system of claim 4 wherein said gas is air, and the airflow through the engine provides the oxidant for said surface burning.

6. The system of claim 5 wherein the compressed air from the compressor is heated by heat exchange in the combustion system before passing through the turbine, exhaust air from the turbine providing the oxidant for the surface burning.

7. The system of further comprising a heat exchanger adapted to exchange heat between the exhaust of the surface burning device and the compressor delivery air.

8. The improvement of claim 11 wherein said surface burning takes place within a matrix having an extended surface.

9. The improvement of claim 8 wherein said matrix comprises a cylindrical bundle of fine tubes.

10. The improvement of claim 9 wherein said cylindrical bundle is rotatable about its axis and said surface burning takes place within a segment of the cylinder, the remainder of the bundle being used to exchange heat with the working fluid of the engine.

11. In a system of the type including a heat engine and a surface burning heat input device the improvement wherein said surface burning heat input device comprises: a unitary heat exchange body having an extended surface against which surface burning of a fuel and oxidant mixture can take place, and a heat exchange surface forming part of the heat exchange body and in thermal contact with the extended surface, said heat exchange surface being directly heated by conduction of heat from the extended surface and adapted to transfer this heat to the working fluid of the engine.

* * * * *